(12) United States Patent
Songer et al.

(10) Patent No.: US 7,735,752 B1
(45) Date of Patent: Jun. 15, 2010

(54) SYSTEM FOR CONTROLLED AERIAL DISTRIBUTION OF SUBSTANCES

(76) Inventors: Harvey E. Songer, 1407 Greene 205 Rd., Beech Grove, AR (US) 72412; Casey L. Couch, 1407 Greene 205 Rd., Beech Grove, AR (US) 72412

(*) Notice: Subject to any disclaimer, the term of this patent is extended or adjusted under 35 U.S.C. 154(b) by 557 days.

(21) Appl. No.: 11/677,426

(22) Filed: Feb. 21, 2007

(51) Int. Cl.
*B64D 1/18* (2006.01)
*B64D 1/00* (2006.01)
*B05B 1/20* (2006.01)
*B05B 1/16* (2006.01)

(52) U.S. Cl. .................. 239/171; 239/69; 239/163; 239/170; 239/306; 244/136

(58) Field of Classification Search .......... 239/2.1, 239/14.1, 67, 69, 70, 146, 159, 160, 161, 239/163–168, 170, 171, 289, 303–306, 329; 169/53; 244/1 R, 136
See application file for complete search history.

(56) References Cited

U.S. PATENT DOCUMENTS

| | | | | | |
|---|---|---|---|---|---|
| 3,455,511 A | * | 7/1969 | Fedorenko | ................ | 239/171 |
| 3,933,309 A | * | 1/1976 | Odegaard | ................ | 239/171 |
| 4,055,303 A | * | 10/1977 | Brown | ................ | 239/142 |
| 5,025,988 A | * | 6/1991 | Lund | ................ | 239/171 |
| 5,975,425 A | * | 11/1999 | Carlton | ................ | 239/3 |
| 6,003,782 A | * | 12/1999 | Kim et al. | ................ | 239/171 |
| 6,871,796 B2 | * | 3/2005 | Jones et al. | ................ | 239/171 |

* cited by examiner

*Primary Examiner*—Darren W Gorman
(74) *Attorney, Agent, or Firm*—Joe D. Calhoun; Rashauna A. Norment

(57) ABSTRACT

An improved system for controlled aerial distribution of substances such as chemicals upon crops in a select field, including coordinating the simultaneous independent application of two different substances. The system may include a pair of sub-systems, one of which includes a computer controlling a variable flow valve capable of varying the release of a substance from the first subsystem. There may also be a second subsystem having a pump activated by a lever that also opens and closes the fluid communication of the first subsystem, in this basic version of the invention, manually positioning the lever to open the spray valve also commences continuous release of a second substance from the second subsystem at a constant rate, until the lever is positioned to close the first fluid communication. In more sophisticated versions, the second sub-system may include a second computer controlling a second variable flow valve capable of varying the release of a substance from the second subsystem, or the second variable flow valve may be controlled by a separate output from the first computer.

19 Claims, 5 Drawing Sheets

SYSTEM FOR CONTROLLED AERIAL DISTRIBUTION OF SUBSTANCES

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

This invention generally relates to the field commonly known as crop dusting, more particularly known as aerial application of fertilizers, fungicides, pesticides or other substances affecting the yield of a crop. However, the present invention need not be limited to aircraft such as airplanes or helicopters; aerial distribution may be considered distribution by any vehicle that disperses a substance over desired substratum via air rather than essentially directly upon the substratum. More specifically, the invention disclosed herein relates to a system for controlling the distributions of at least two different substances, independently of each other.

The invention is essentially an improvement to existing aerial application (crop dusting) systems for the delivery of chemical(s) or other substance(s) to fields. Traditionally, aerial applications by airplanes or helicopters utilize a tubular boom underneath the primary wing or rotor, supporting a row of first nozzles or other valves governing release of fertilizer, fungicide, pesticide or another substance transported within the boom; for the sake of convenience, such substances will be referred to merely as a substance, which may include one or more solitary substance(s) as well as combination(s) and/or mixture(s) of the same, in whatever form that is capable of such combination(s) and/or mixture(s) (primarily liquid or solid). The desired concentration of first substance is typically supplied from a first tank on board the aircraft, then pressure-pumped through the boom and out of the first nozzles as the aircraft flies over the desired field. When more than one substance is desired to be distributed over the same field, the aircraft traditionally had to spray the field two or more times using the same first set of nozzles.

The improved system disclosed herein applies two separate substances, independent in amount (or rate of distribution) and/or application pattern (or timing of distribution), in one pass over the field, using two essentially independent subsystems of tanks, pumps and nozzles. This system can project a second substance into the airstream flow of a first substance, while the first substance is being released from a nearby first nozzle of the first subsystem. The invention disclosed herein will also allow a second substance (that may not be legally mixed with a first substance within the same tank) to essentially be mixed in the air outside the aircraft, and applied at a rate and pattern separate from the first substance, according to the desired chemical distribution prescription for the field.

Although the present invention has a number of embodiments, it essentially comprises a means of transporting a second substance to a second set of dispersion nozzles, separate from the transport and dispersal of a first substance. The invention may also include a means of independently maintaining the constancy of dispersion of the second substance, despite any variation in dispersion of the first substance. Alternatively, the invention may include a means of independently controlling variation of dispersion of the second substance, despite any variation in dispersion of the first substance.

(2) Description of Related Art Including Information Disclosed Pursuant to 37 CFR 1.97 and 1.98. Modern aerial application of agricultural substances requires precision in the geographic positioning and piloting of the aircraft, and control of the system used to distribute the substance(s). Such precision agriculture practices therefore require various technologies that allow agricultural personnel to use information management tools to optimize agriculture production. These technologies allow aerial application pilots to improve application accuracy and efficiency, which saves time and money for the farmer and the pilot. Several types of precision agriculture technologies include global positioning systems (GPS), geographic information systems (GIS), soil sampling, yield monitoring, nutrient management field mapping, aerial photography, variable rate technology, and pulse width modulation.

Variable rate technology facilitates distribution of a desired amount of crop production substance in a variable pattern or amount on a field; variable rate technology is used in agricultural operations such as fertilizer application, seeding and chemical applications. Variable application rates typically change according to a preset map, or through information gathered by sensors. Major advantages of using variable rate technology include conservation of fuel, and minimizing excessive spraying of chemical on crops; both advantages save farmers money.

A global positioning system provides the location information to enable the variable rate equipment to adjust the flow rate for different sections of the field. GPS operates through a system of satellites, computers and receivers that is able to determine the latitude and longitude of a receiver on earth, by calculating the time difference for signals from different satellites to reach the receive. GPS enables agricultural pilots to more easily track the acres that have been sprayed, track the spray application rate and log the data.

Another modern technology for aerial application is a geographic information system, which is essentially a computer based collection of information that can be displayed in the form of maps. GIS provides lots of useful information such as field borders, soil types, buildings, pesticide-sensitive areas and pest populations, all of which can be displayed using interactive maps. GPS and GIS can be integrated, allowing a pilot to successfully maneuver while efficiently spraying a field using variable rate equipment.

Pulse width modulation allows independent control of nozzle flow rate and operating pressure during an application. This means flow rate can be adjusted to maintain a desired amount of gallons per acre (of fluid substances), without significantly changing droplet size. Alternatively, droplet size can be changed to reduce drift while not affecting the flow rate (gallons per acre).

There are many aerial distribution systems that distribute chemicals and other substances at a fixed rate and steady pattern, which are standard on crop dusting airplanes and helicopters. More recently, there have appeared aerial distribution systems that distribute a substance at variable rates and/or variable distribution patterns on a particular target area. These systems typically utilize onboard computers and GPS transceivers to receive relevant data and coordinate the release of substance on the target area. The following is a representative example of such a known system. (For the sake of convenience and clarity, to distinguish elements that may appear separately in two systems (also known as subsystems), the element of the first subsystem may include a "first" in its identification whereas the element of the second subsystem may include a "second" in its identification.)

As a prelude to going airborne to apply chemicals or other substances, the owner of the target field (or the pilot or other agricultural personnel) often collects relevant information such as IR imagery, yield data, grid samples, the amount of substance to be applied to the target field, the geographical coordinates of the target field and the location of portions of the target field to receive more (or less) of the substance, and the current wind speed and direction. Some of that information is saved in a format for recognition by a computer, such as (for example) on a field-specific "prescription card" in machine readable language. The onboard computer may also be programmed to govern a variable flow control valve, and the computer also receives flight-in-progress data such as the location of the target area and the aircraft, the ground speed and direction of the aircraft, and the volume of the first substance passing downstream of the flow control valve.

The first tank is filled with the first substance through the infill end of the first infill line, often located at a midpoint along the aircraft fuselage. The first infill line often extends forward to fill the first tank (often in front of cockpit). Often with the assistance of a pump, the first substance exits the bottom of the first tank (often underneath the front nose of the aircraft), through a relatively large pipeline that is often opened and closed via mechanical linkage, often from a cockpit lever operated by the pilot. The pilot typically pushes the lever forward (upon approach to the target field) to open the spray valve within the pipeline, to ready the system for allowing the computer to commence distribution of the substance as directed by the prescription. (Pulling the lever aft closes the spray valve, causing the substance to return to the tank; this usually occurs as the aircraft is leaving the target field, or in the event it becomes necessary to manually override the automated distribution of substance.)

The first substance flows aft through the pipeline to a flow control valve (such as, for example, the IntelHow® control valve marketed by Del Norte Technology, Inc.); the flow control valve has sensors that allows the onboard computer to essentially compare the volume of the first substance that has already passed aft versus the volume of the first substance prescribed at that time by the prescription card, then determine whether that amount that actually passed through satisfies the prescribed amount (given the aforementioned aircraft and field data). Depending upon that comparison, the flow control valve does one of the following: (a) permits all of the first substance to flow through the downstream flowline into a distribution channel such as a hollow boom; (b) partially blocks the downstream flowline, allowing only some of the first substance to flow through the downstream flowline to the boom; or (c) totally blocks the downstream flowline, preventing any of the first substance from flowing through the downstream flowline to the boom.

A first duct, off of the downstream flowline, diverts a sample of the first substance to a first pressure meter, which determines whether there exists the threshold pressure needed for starting the distribution of the first substance through the first nozzles spaced periodically along the hollow boom affixed beneath the aircraft wing or rotor. The boom fills with the first substance and, when the boom pressure of first substance exceeds the nozzle release threshold, the first substance sprays out of the first nozzles in a spraystream.

Once the pilot positions the aircraft to approach the target area at an acceptable altitude and speed, and opens the pipeline spray valve using the cockpit lever, the computer controls the amount (rate) and pattern (timing) of the first substance released from the first nozzles and thereby applied to the target area, until the pilot closes the pipeline upon leaving the target area.

The pilot then re-positions the aircraft to spray another swath of the field with the first substance. To the extent desired (especially as directed by the prescription card), the computer may vary the amount and/or pattern of the first substance released in each swath.

For first substances that are powdered or granulated, the boom and first nozzles may be replaced by a bin and an exit grate having gates; traditionally the pilot controlled the timing and amount of gate opening and closing using a hand lever (with a stop) similar to that used to control the fluid application system. More recently, gate control may be automated and computerized, such as (for example) with the system manufactured by Houma Avionics, Inc. under the name Auto-Cal. Such automatic gate controllers may be interfaced with and governed by an onboard computer such as that previously described.

Some systems have patents. Known in the art are the following, arguably related to the patentability of the present invention:

| U.S. Pat. No. | $1^{st}$ Inventor | Date of Patent |
| --- | --- | --- |
| 3,933,309 | Odegaard | Jan. 20, 1976 |
| 3,994,437 | Kitterman | Nov. 30, 1976 |
| 4,055,303 | Brown | Oct. 25, 1977 |
| 4,703,891 | Jackson | Nov. 3, 1987 |
| 5,915,377 | Coffee | Jun. 29, 1999 |
| 5,915,377 | Carlton | Nov. 2, 1999 |
| 5,003,782 | Kim | Dec. 21, 1999 |
| 6,871,796 | Jones | Mar. 29, 2005 |

U.S. Pat. No. 3,933,309 issued to Odegaard appears to disclose a spray boom including separate internal compartments, each having a row of nozzles running the length of the underside of the boom; each compartment receives respective spray material through an infeed port in the compartment wall adjacent a respective feeder tank. The nozzles for each compartment have ball valves that are spring-biased closed, opening when air pressure in the compartment exceeds the spring biasing. There is a common air pump that pressurizes the feeder tanks, which have piping running through control valves en route to the respective compartments. When the pilot opens a control valve, pressurized spray material in a feeder tank flows into the respective compartment, under pressure in excess of the air pressure existing in the compartment; when it exceeds the spring biasing, the ball valve opens and allows the material to spray out of the nozzle.

The Odegaard patent discloses that it is intended to provide a spray boom with "improved control over the rate of discharge of the spray material so that the same or different materials can be applied at selectively different rates." (Column 1, lines 43-47.) It also discloses that it is intended to provide a spray boom "which is capable of having the spray pattern selectively varied while in flight to maximize the efficiency and effectiveness of distribution of the material to be sprayed and to provide better control of the patterns so that material will not be sprayed on areas it should not be sprayed". (Column 2, lines 3-9.) However, the Odegaard patent discloses that the "controls for admitting material to compartments . . . form no part of this invention, nor does the means for controlling the pressure within the compartments to control the opening and closing of the ball valves". (Column 4, lines 47-51.) Shortly thereafter, this patent discloses that the "controls may be such that each compartment has the same or a different rate of discharge". (Column 4, line 62-63) Later, the Odegaard patent discloses that the "separate compartments also permit the use of different types of nozzles which can discharge at different rates or provide a different character of discharge therefrom, such as in the size of the droplets". (Column 5, lines 15-17.) At one place, this patent discloses that the nozzles can have special arrangements to "accomplish some special result, such as overlapping strips of sprayed materials". (Column 5, lines 21-22.) More often however, this patent indicates that the rows of nozzles are staggered so that "material discharged from the openings of one compartment fall on an area not covered by the material discharged from the openings of the second compartment." (Column 6, lines 35-38.)

Notably, the Odegaard patent does not disclose a second substance dispersal system having a second (independent) charging pump, and a second set of nozzles serviced by essentially separate conduits for almost instantaneous precision discharging. Neither does this patent disclose a GPS receiver, or computer hardware and software converting the wind speed and the aircraft's speed, altitude and direction, to accomplish dispersion of different substances in accordance with a predetermined dispersion prescription for a particular field. Moreover, although the Odegaard patent mentions separate dispersal systems allowing simultaneous dispersion of two different chemicals, one at a constant rate and the other at a different variable rate and/or pattern of dispersion, this patent does not disclose anything enabling anybody to accomplish those ultimate results.

U.S. Pat. No. 6,871,796 issued to Jones et al. discloses a spray boom including a liquid supply conduit having a row of nozzles, the conduit being rotatable around a longitudinal axis to vary the angulation of the nozzles; there is also a flow shut-off valve approximately midway along the conduit, allowing the pilot to stop the supply of liquid spray material to the conduit nozzles nearest the wingtips. This patent also discloses use of a "ground positioning system", and a computer program that performs such functions as selecting a desired nozzle performance, determining the nozzle angle required for achieving that performance at a measured wind speed, adjusting the nozzle angle, and actuating the flow shut-off valve in response to deviation from the predetermined flight path.

The Jones patent does not disclose a second chemical dispersal system that is separate and independent from the first chemical dispersal system, having a second chemical reservoir, independent charging pump, and set of nozzles serviced by essentially separate conduits for almost instantaneous precision discharging. And except for nozzle angulation, this patent does not disclose computer hardware and software converting the wind speed to accomplish dispersion of the chemicals in accordance with a predetermined dispersion prescription for a particular field.

BRIEF SUMMARY OF THE INVENTION

Given the increased cost of aircraft fuel, it is advantageous to be able to apply two different substances to a target area during the same swath. Moreover, there may be advantages of applying two substances together, in combination, rather than applying one substance before the other. And whereas it is illegal or possibly dangerous to pre-mix some pairs of substances in a single tank before distribution, allowing the substances to mix in the air outside the two sets of nozzles avoids those problems. Accordingly, added utility is derived from being able to coordinate both subsystems.

The present invention is an improvement for essentially facilitating the application of two different substances to a target area such as upon crops within a selected field.

The invention described herein may be used with most (if not all) existing boom systems. It is specifically designed to interface with existing crop dusting systems having at least one boom emanating from the fuselage of the aircraft.

One primary object of the present invention is to provide an improved dual-subsystem means of applying chemicals and other substances to crops in a field.

Another primary object of the invention is to provide a means of coordinating two independent substance distribution subsystems, both by mechanical means and electronic means.

Another object of the invention is to provide a means of mixing two separate airborne substances during distribution to a target area.

Another object of the invention is to provide a first variable distribution means coordinated with a second variable distribution means.

Other objects will be apparent from a reading of the written description disclosed herein, together with the claims.

BRIEF DESCRIPTION OF THE SEVERAL VIEWS OF THE DRAWINGS

FIGS. 1 through 5 illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

Figure 1:
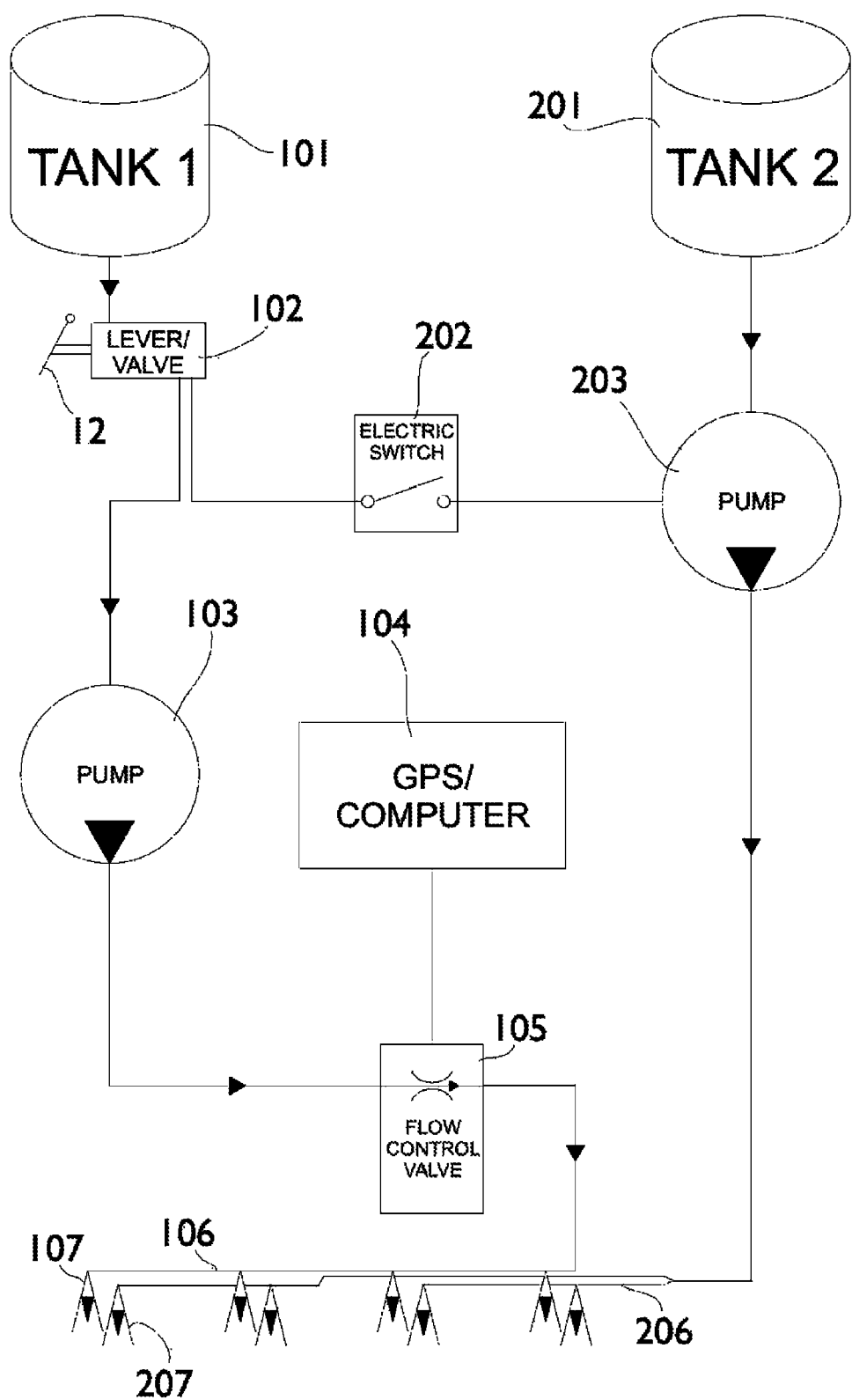
FIG. 1 depicts a schematic view of the invention of FIG. 1, in isolation.
Figure 2:
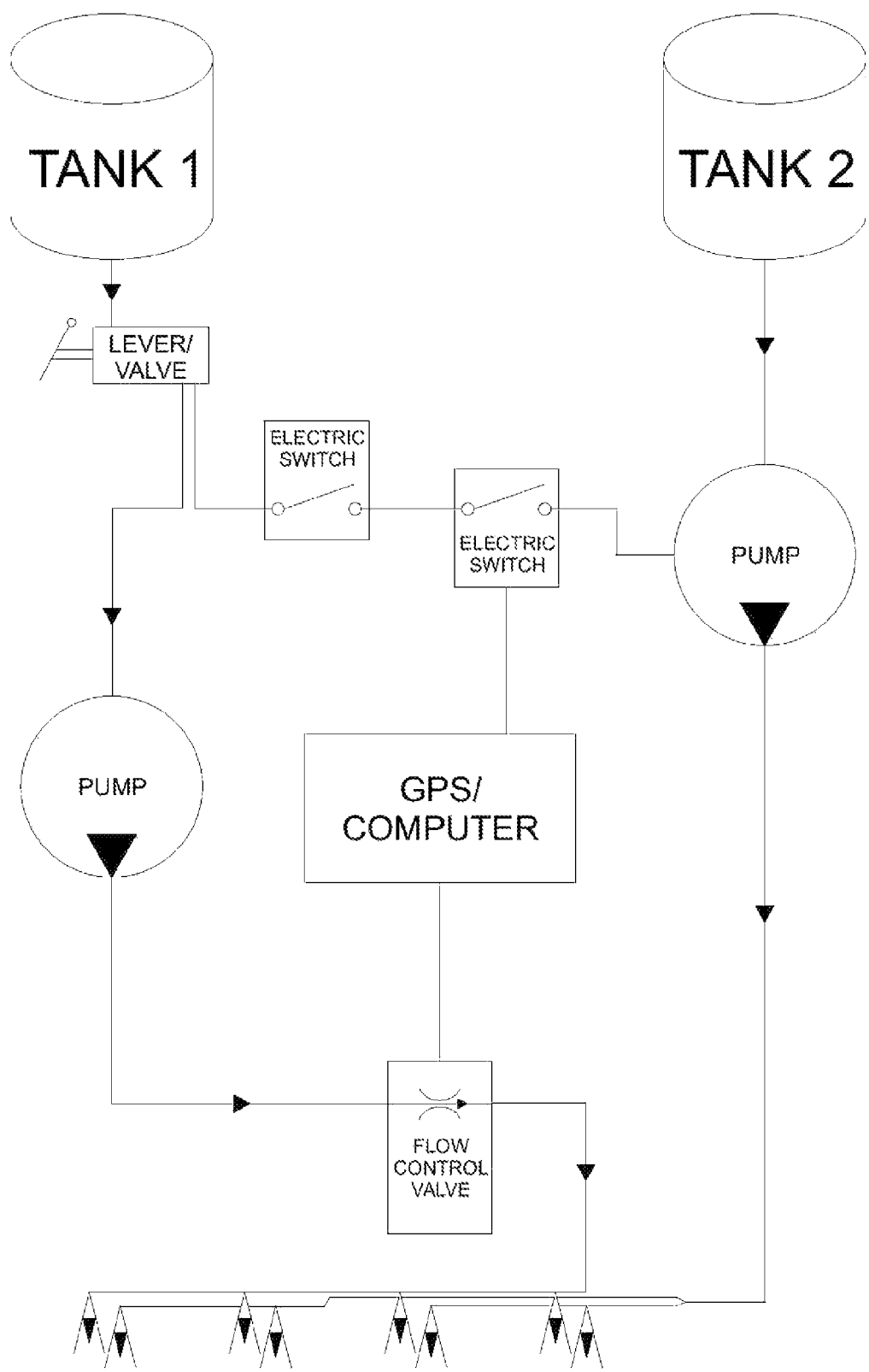
FIG. 2 depicts a schematic view of an alternate embodiment of the invention, in isolation.

For the sake of simplicity and to give the claims of this patent application the broadest interpretation and construction possible, the following definitions will apply:

The term "substance" may include one or more homogeneous substance(s) as well as combination(s) and/or mixture(s) of the same, in whatever form that is capable of such combination(s) and/or mixture(s) and that is capable of movement through an enclosed system for distribution from an exit point such as a nozzle or gate.

The phrase "fluid communication" or derivative thereof essentially means enclosed and allowing movement of substance within, without contact with any external elements, regardless of whether or not the substance is liquid.

The term "spraystream" or derivative thereof essentially means the path of the substance immediately upon passing a distribution subsystem exit point such as a nozzle or gate, regardless of whether or not such exit qualifies as a spray.

The term "activation" or derivative thereof, especially when used in the context of the lever controlling the opening or closing of a spray valve within the fluid communication(s) of a system or subsystem(s), essentially means to make ready for the flow of substance therethrough, regardless of whether or not there is any requisite electronic stimulation for such flow at that time. For example, in one version of the dual subsystem invention disclosed herein, although forward movement of the lever mechanically opens the spray valve so that substance may flow therethrough, that first subsystem may not allow release of that first substance absent a concurrent signal to a first flow control valve authorizing the flow of that first substance to the first nozzles; however, that same opening of the spray valve may simultaneously activate a pump for the second subsystem, so that a second substance may flow to the second nozzles regardless of whether such lever activation results in the flow of any first substance to the first nozzles. The same lever activation may merely ready the first subsystem to (upon proper electronic signaling) allow flow of its substance to the nozzles, and also activate the second subsystem pump to allow flow of that substance to its nozzles regardless of whether the first nozzles are releasing substance.

The term "authorization" or derivative thereof essentially means the results of a requisite concurrent signal to a flow control valve controlling the flow of that substance to the nozzles.

The term "forward" or derivative thereof essentially means toward the front leading end of an aircraft.

The term "aft" or derivative thereof essentially means toward the rearward trailing end of an aircraft.

The term "port" or derivative thereof essentially means toward the left side of an aircraft, when facing forward.

The term "starboard" or derivative thereof essentially means toward the right side of an aircraft, when facing forward.

However, such terminology is used only as a convenient reference point, to the extent that it is not functionally limiting or narrowing. Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although the means of fluid communication may be fabricated using plastic, metal other material(s) (or mixtures or combinations thereof), it may be fabricated using any material that satisfies the structural and/or functional requirements for maintaining fluid communication. Similarly, unless indicated by the context of usage, the use of different terms for elements having the same or similar functions does not necessarily mean that there is a material difference in the respective elements. For example, fluid communication may be described using such elements as pipelines, flowlines, conduits, hoses, ducts, tubes or tubules; unless indicated otherwise by the context of usage, any such element may be substituted for any of the other elements.

The most general form of the invention disclosed herein includes (comprises) a means of coordinating the aerial distribution accomplished by a second distribution subsystem with the aerial distribution accomplished by a first distribution subsystem that may be known in the art. The second subsystem may be relatively simple, distributing the second substance at a constant rate and steady pattern, with or without computer governance; or the second subsystem may have computer governance for distributing the second substance at variable rates and/or patterns of distribution.

Such coordination requires a linking of both subsystems so that both may activate and deactivate at the same time, even though each otherwise may operate independently of the other. One version of the invention essentially includes a computer controlling a variable flow valve capable of varying the release of a substance from the first subsystem, and a second subsystem having a pump activated by a lever that also opens and closes the fluid communication of the first subsystem; in this basic version of the invention, manually positioning the lever to open the first fluid communication also commences continuous release of a second substance from the second subsystem at a constant rate, until the lever is positioned to close the first fluid communication.

An alternative version results in a second subsystem capable of intermittent pumping of the second substance out of the second subsystem nozzles, at a constant rate. In addition to the pump being activated by the positioning of the lever, the pump also requires authorization by an electronic signal from the computer to initiate pumping. That signal may be emitted from a computer controlling the first subsystem, or from a separate onboard computer. In the single-computer system, the authorization may be prompted by a particular entry or value on the prescription card, such as (for example) a "zero-rate" prescription signaling a void area upon which no substance should be distributed from the other subsystem. Alternatively, the computer may be capable of dual outputs, controlling each subsystem independently of the other.

Another alternate version includes a computer controlling a second variable flow valve capable of varying the rate and/or pattern of release of a second substance from the second subsystem. As explained above, that authorization may be accomplished by a signal that may be emitted from a computer controlling the first subsystem, or from a separate onboard computer.

A brief explanation of the fluid flow of the more simple version would be beneficial. The user would fill the second tank with the second substance through the infill end of the second infill line, often located at a mid point along the fuselage, next to the first infill line to front first tank. Often with assistance from an injection pump (that is independent of any pump for the first subsystem), the second substance exits the bottom of the second tank and flows through the intake conduit to the injection pump. The injection pump pushes the second substance to flow through the second duct, up to a metered pressure regulator valve in the cockpit (with that valve perhaps governed by the user's rotation of a T-screw in cockpit). At the appropriate pressure, the second substance flows through a pressure hose to a second divider, which separates the flow of the second substance into a port (left-side) boom outerflow tube and a starboard (right-side) boom outerflow tube. Although the tubes may extend within the boom, it is often simpler to attach the tubes to the outside of the boom. (However, the use of a separate tube or smaller tubule of a precise length, for each second nozzle, has utility in facilitating the nearly-instantaneous charging of the fluid communication leading up to each of the respective nozzles, such precision charging enhances the speed and accuracy of the second subsystem, especially in an embodiment capable of variable rate applications.) The second substance may flow through the respective tube to a supplemental splitter further separating the flow of the second substance through tubules to separate second nozzles adjacent the same respective boom nozzles.

The second (injection) pump is electronically linked by an electronic switch (202 of FIG. 1) to the lever (12) used to open or close the pipeline spray valve (102) of the first subsystem. As schematically depicted in FIG. 1, once the pilot positions the aircraft to approach the target area at an acceptable altitude and speed, opening the pipeline spray valve using the spray lever automatically activates the injection pump (203), which only pumps the second substance at a constant rate via the tubes and/or tubules to the second nozzles. (When the lever is positioned to open the spray valve, the linking switch's circuit is closed to allow the flow of electrical power to the second pump, thereby commencing pumping of the second substance continuously at an essentially constant rate until the lever is positioned to close the spray valve of the first subsystem.) If the first subsystem is (at that time) authorized to push the first substance out the first nozzles, the second substance is released into the spraystream of the boom nozzles of the first subsystem. If the first subsystem is not so authorized at that time, the second substance pumped out the second nozzles is in a spraystream all its own. This simple second subsystem distributes the second substance at a constant rate and steady pattern, independent of the rate and pattern of distribution of the first substance by the first subsystem controlled by the computer.

In most general form, the invention disclosed herein comprises (includes) a system aboard an aircraft for controlled aerial distribution of a first substance and a second substance into any spraystream of the first substance, onto a target area of substratum or portions thereof. The system includes a first subsystem (known in the field) to release the first substance in a spraystream. This first subsystem includes a first reservoir means of holding the first substance awaiting distribution; it also includes a first lateral distribution means defining a first substance distribution chamber extending (or otherwise distributing substance) laterally from the aircraft fuselage, and including a plurality of first exit point means arrayed periodically thereupon and allowing release of the first substance in a spraystream into the air outside the distribution chamber. Also included in the first subsystem are fluid communication means between the first reservoir means and the first exit point means.

The most general form of the second subsystem includes a second reservoir means holding the second substance awaiting distribution. It also includes a second lateral distribution means defining a second substance distribution chamber extending (or otherwise distributing substance) laterally adjacent the first lateral distribution means, and including a plurality of second exit point means arrayed periodically thereupon and allowing release of the second substance into any spraystream of the first substance from the first exit point means. The second subsystem further includes a second pump means in fluid communication between the second reservoir means and the second exit point means; the second subsystem may be activated and deactivated by appropriate positioning and repositioning of a lever also jointly opening and closing the fluid communication between the first reservoir means and the first exit point means. Positioning the lever to jointly activate the second pump means and the fluid communication between the first tank and the boom, upon the aircraft's approach of a target area, jointly commences the distribution of both the second substance from the second exit point means and (to the extent of requisite authorization) any first substance from the first exit point means.

In another more particular version of the invention, the first reservoir means includes a first tank (101). The first lateral distribution means includes a hollow boom (106) providing fluid communication to the port side of the aircraft and to the starboard side of the aircraft. The first exit point means includes a plurality of first nozzles (107) arrayed periodically along the boom. The fluid communication between the first tank and the boom further includes a first flow control valve means (105) to control the flow of the first substance to the boom, and a first pump means (103) in fluid communication between the first tank and the first flow control valve. The first prior art subsystem further includes a first governance means (104) governing the rate of distribution of the first substance from the first nozzles and the pattern of said distribution; said first governance means include computer hardware having software programming and functional connection to the first flow control valve means; it also includes stored data concerning the target area, for recognition by the software programming to enable outputting of electronic stimuli to authorize the passage of the first substance through the first flow control valve means and thereby govern the rate and pattern of subsequent release of the first substance from the first nozzles.

In this more particular version of the invention, the second reservoir means includes a second tank (201), the second pump means (203) includes an injection pump activated and deactivated by said appropriate positioning and repositioning of the lever (12); the second exit point means includes a plurality of second nozzles (207), and the second lateral distribution means includes a plurality of tubes (206) defining second substance distribution chamberlets, each of said chamberlets including a separate second nozzle adjacent a respective first nozzle and guiding the release of the second substance into any spraystream of the first substance released from the respective first nozzle. The second subsystem further includes a second pressure control means. Moreover, the second lateral distribution means further includes a pressure hose providing fluid communication from the second pressure control means to a second divider (208) separating the flow of the second substance into tubes supplying a port side boom outerflow and tubes supplying a starboard side boom outerflow. The tubes may preferably extend along the underside of the boom, and each respective second nozzle may preferably be situated aft of the respective first nozzle.

In another more particular version of the invention, the first flow control valve means includes an IntelHow® valve, and the first governance means includes a Del Norte computer with appropriate software and programming to govern the valve. The second pressure control means may further include a metered pressure regulator valve regulating the pressure of the second substance in the second lateral distribution means.

In yet another more particular version of the invention, the pressure regulator valve includes a T-screw adjuster, whereby rotation of said T-screw by a user in the aircraft changes the pressure of the second substance in the second fluid communication system (especially the nozzles).

The first lateral distribution means may further include a gate control means such as an AutoCal gate control (not shown) for controlling the flow of a granular first substance.

Positioning the lever to jointly activate the second pump means and open the fluid communication between the first tank and the first flow control valve means, upon the aircraft's approach of a target area, jointly commences both the distribution of the second substance at a constant rate and the independent distribution of the first substance at a constant rate. In a simple version of the invention positioning the lever to jointly activate the second pump means and open the fluid communication between the first tank and the first flow control valve means, upon the aircraft's approach of a target area, jointly commences both the distribution of the second substance at a constant rate and distribution pattern and the independent distribution of the first substance at whatever rate(s) and pattern(s) are directed by the first governance means.

Figure 3:
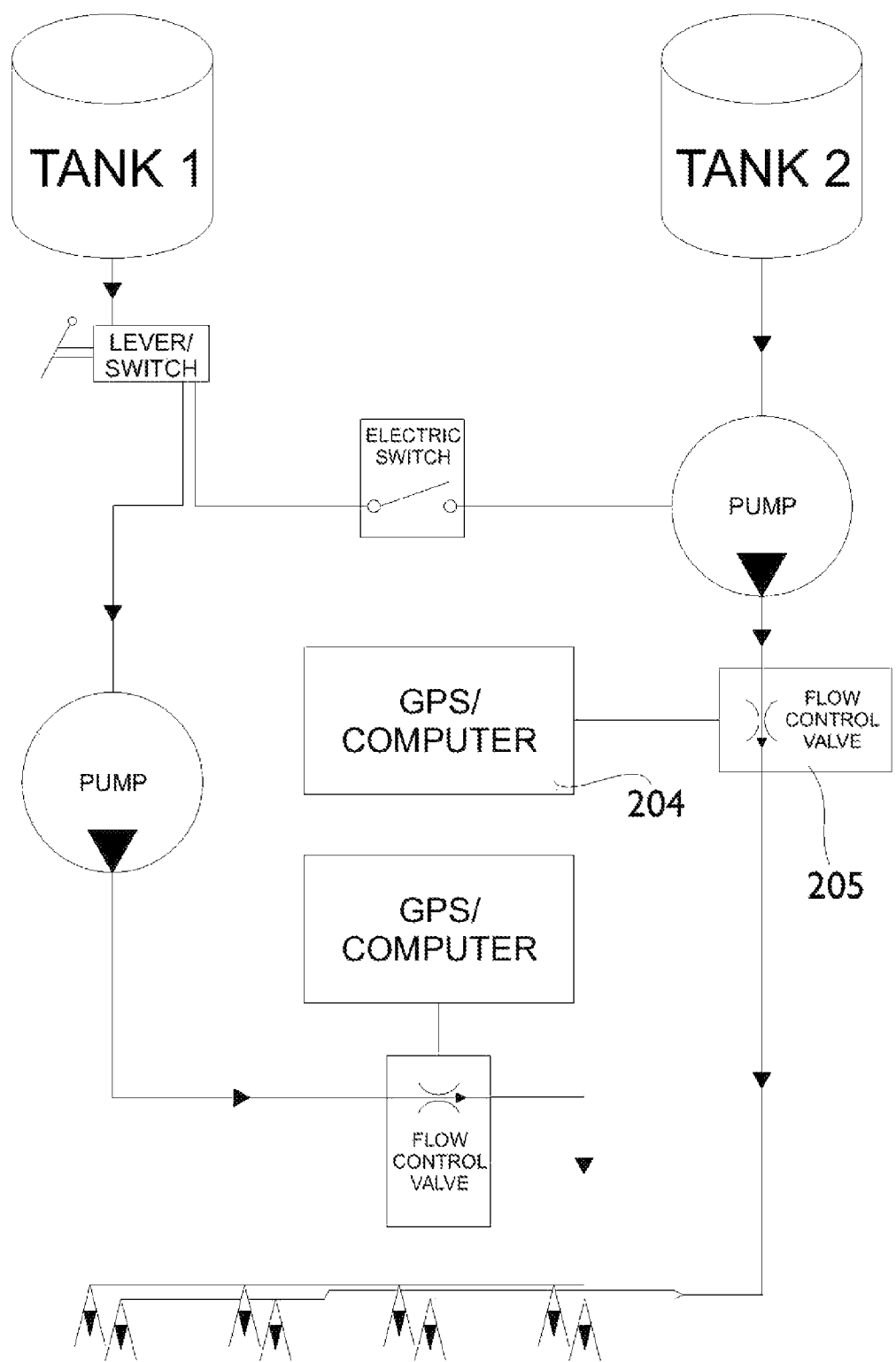
FIG. 3 depicts a schematic view of an alternate embodiment of the invention, in isolation.
Figure 4:
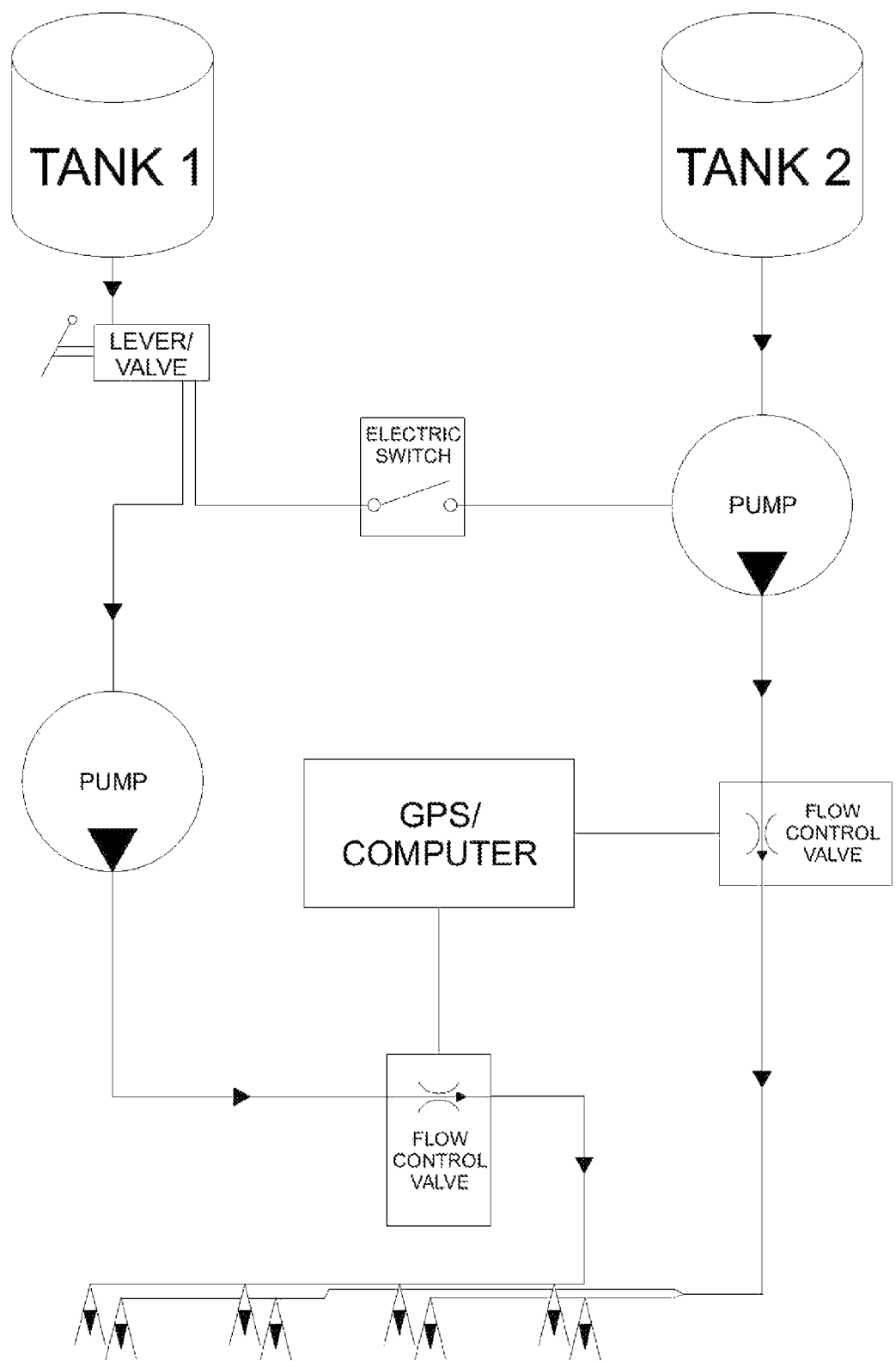
FIG. 4 depicts a schematic view of an alternate embodiment of the invention, in isolation.
Figure 5:
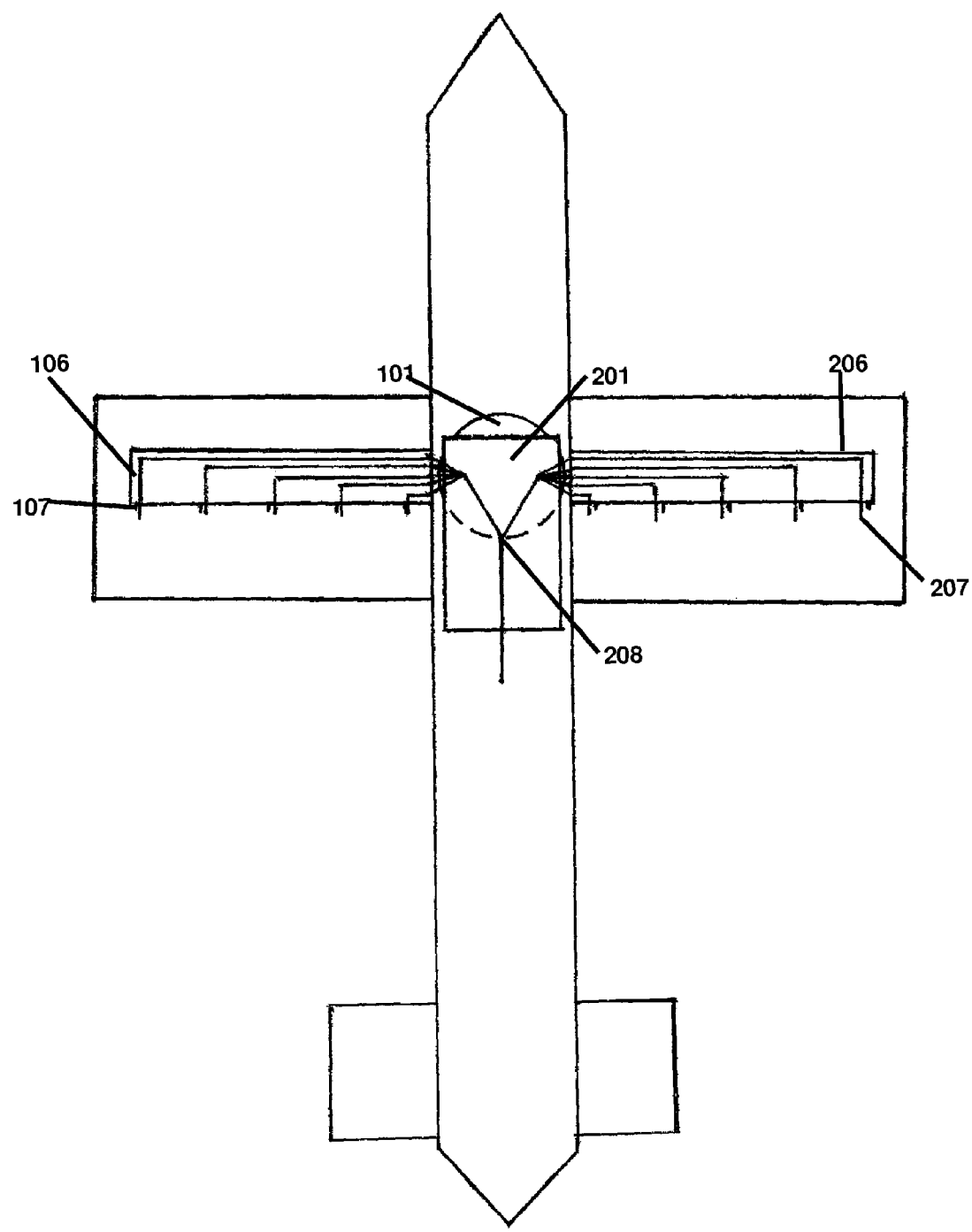
FIG. 5 depicts a schematic drawing of a representative airplane, indicating one general configuration of elements.

In a more sophisticated version of the invention, the second subsystem fluid communication means further includes a second flow control valve means (205 of FIG. 3) to control the flow of the second substance to the second lateral distribution means. The second subsystem further includes a second governance means (204) governing the rate of distribution of the second substance from the second nozzles and the pattern of said distribution; said second governance means includes computer hardware having software programming and functional connection to the second flow control valve means and including stored data concerning the target area, for recognition by the software programming to enable outputting of electronic stimuli to control the passage of the second substance through the second flow control valve means and thereby govern the rate and pattern of subsequent release of the second substance from the second nozzles. Preferably, the second flow control valve means includes an Intelliflow® valve, and the second governance means includes a Del Norte computer with appropriate software and programming to govern the valve.

Accordingly, positioning the lever to jointly activate the second pump means and open the fluid communication between the first tank and the first flow control valve means, upon the aircraft's approach of a target area, jointly commences both the distribution of the second substance at whatever rate(s) and pattern(s) are directed by the second governance means and the independent distribution of the first substance at whatever rate(s) and pattern(s) are directed by the first governance means.

A most detailed version of the invention comprises a system aboard an aircraft for controlled aerial distribution of a first substance and a second substance into any spraystream of the first substance, onto a target area of substratum or portions thereof, the system includes:

(a) a first subsystem known to release the first substance therefrom in a spraystream, includes a first tank holding the first substance awaiting distribution, a hollow boom defining a first substance distribution chamber extending laterally from the aircraft fuselage and including a plurality of first nozzles arrayed periodically thereupon and allowing release of the first substance in a spraystream into the outside air, and fluid communication means between the first tank and the boom includes a first pump means between the first tank and a pipeline to a first Intelliflow® control valve, and a flowline from the first Intelliflow® control valve to a first divider separating the flow of the first substance into a port side boom flow and a starboard side boom flow;

(b) the first subsystem further includes a first Del Norte computer having software programming and functional connection to the first Intelliflow® control valve and including stored data concerning the target area, for recognition by the software programming to enable outputting of electronic stimuli to control the passage of the first substance through the first Intelliflow® control valve and thereby govern the rate and pattern of subsequent release of the first substance from the first nozzles;

(c) a second subsystem includes a second tank holding the second substance awaiting distribution, a plurality of second nozzles and fluid communication between the second tank and the second nozzles includes:

(1) an intake conduit extending from the second tank to an injection pump, (2) a second duct extending from the injection pump to a metered pressure regulator valve having a T-screw adjuster, (3) a pressure hose extending from the pressure regulator valve to a second divider separating the flow of the second substance into a plurality of tubes extending laterally beneath the boom and supplying a port side boom outerflow and a starboard side boom outerflow, each of said tubes defining a chamberlet terminating in a respective second nozzle aft of a respective first nozzle and guiding the release of the second substance into any spraystream of the first substance released from the respective first nozzle;

(d) the second subsystem activated and deactivated by appropriate positioning and repositioning of a lever also jointly opening and closing the fluid communication between the first tank and the first Intelliflow® control valve, whereas positioning the lever to jointly activate the injection pump and open the fluid communication between the first tank and first Intelliflow® valve, upon the aircraft's approach of a target area, jointly commences the distribution of both the second substance from the second nozzles and any first substance from the first nozzles.

In this most detailed version, positioning the lever to jointly activate the injection pump and open the fluid communication between the first tank and the first Intelliflow® control valve, upon the aircraft's approach of a target area, jointly commences both the distribution of the second substance at a constant rate and the distribution of the first substance at a constant rate.

In a more sophisticated version of this most detailed version, positioning the lever to jointly activate the injection pump and open the fluid communication between the first tank and the first Intelliflow® control valve, upon the aircraft's approach of a target area, jointly commences both the distribution of the second substance at a constant rate and distribution pattern and the independent distribution of the first substance at whatever rate(s) and pattern(s) are directed by the first Del Norte computer. Better yet, the second subsystem fluid communication means further includes a second Intelliflow® control valve to control the flow of the second substance to the tubes. The second subsystem further includes a second Del Norte computer governing the rate of distribution of the second substance from the second nozzles and the pattern of said distribution, the second Del Norte computer having software programming and functional connection to the second Intelliflow® control valve and including stored data concerning the target area, for recognition by the software programming to enable outputting of electronic stimuli to control the passage of the second substance through the second Intelliflow® control valve and thereby govern the rate and pattern of subsequent release of the second substance from the second nozzles. Accordingly, positioning the lever to jointly activate the second injection pump and open the fluid communication between the first tank and the first Intelliflow® control valve, upon the aircraft's approach of a target area, jointly commences both the distribution of the second substance at whatever rate(s) and pattern(s) are directed by the second Del Norte computer and the independent distribution of the first substance at whatever rate(s) and pattern(s) are directed by the first Del Norte computer.

Besides the improve substance distribution system disclosed herein, the invention also includes a method of using a system described herein. One general version of the method includes the steps of:

(a) installing and priming the first subsystem and the second subsystem on an aircraft having a first substance and a second substance;

(b) upon the craft's approach of a target area, positioning the lever to jointly commence both the distribution of the second substance and the independent distribution of the first substance; and (c) upon leaving the target area, repositioning the lever to jointly discontinue both the distribution of the second substance and the independent distribution of the first substance.

In that method of using that system, the priming includes the steps such as:

(a) obtaining data concerning the target area, such as (for example) IR imagery, yield data, grid samples, the amount of substance to be applied to the target field, the geographical coordinates of the target field and the location of portions of the target field to receive more (or less) of the substance, the current wind speed and direction, and other relevant GPS or GIS information;

(b) saving or otherwise storing such data on media and/or in a format that is readable and operable by a computer, including (for example) a prescription card;

(c) loading the tank(s) with the amount(s) of substance(s) sufficient to satisfy the dispersal directed by the prescription card.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

We claim:

1. A system improvement aboard an aircraft for controlled aerial distribution of a first substance and a second substance into any spraystream of the first substance, onto a target area of substratum or portions thereof, the aircraft including a first subsystem comprising a first reservoir means of holding the first substance awaiting distribution, a first lateral distribution means defining a first substance distribution chamber for distributing the first substance laterally from the aircraft fuselage and including a plurality of first exit point means arrayed periodically thereupon and allowing release of the first substance in a spraystream into the air outside the first substance distribution chamber, and first fluid communication means between the first reservoir means and the first exit point means, said first fluid communication means including a spray valve activated by a lever, the system improvement comprising a second subsystem comprising a second reservoir means holding the second substance awaiting distribution, a second lateral distribution means defining a second substance distribution chamber for distributing the second substance adjacent the first exit point means and including a plurality of second exit point means arrayed periodically thereupon and allowing release of the second substance into any spraystream of the first substance from the first exit point means, and a second fluid communication means between the second reservoir means and the second exit point means and comprising a second pump means between the second reservoir means and the second exit point means, whereas lever activation of the spray valve concurrently activates the second pump means.

2. An aerial distribution system described in claim 1 above, (a) the first reservoir means comprising a first tank, the first lateral distribution means comprising a hollow boom providing first fluid communication to the port side of the aircraft and to the starboard side of the aircraft, the first exit point means comprising a plurality of first nozzles arrayed periodically along the boom;

(b) the first fluid communication means further comprising a first flow control valve means downstream of the spray valve, to control the flow of the first substance to the boom when the spray valve is activated;

(c) the first subsystem further comprising a first governance means governing the rate and timing of distribution of the first substance from the first nozzles, said first governance means including first computer hardware having software programming and functional connection to the first flow control valve means and including stored data concerning the target area, for recognition by the software programming to enable outputting of first electronic stimuli to control the passage of the first substance through the first flow control valve means and thereby govern the rate and timing of distribution of the first substance from the first nozzles;

(d) the second reservoir means comprising a second tank, the second pump means comprising an injection pump, the second fluid communication means further comprising a pressure hose providing fluid communication to a second divider separating the flow of the second substance into a plurality of tubes defining second substance distribution chamberlets supplying a port side boom outerflow and chamberlets supplying a starboard side boom outerflow, the second exit point means comprising a plurality of second nozzles, each of said chamberlets including a respective second nozzle adjacent a respective first nozzle and guiding the distribution of the second substance into any spraystream of the first substance.

3. An aerial distribution system described in claim 2 above, the tubes extending along the underside of the boom, and each respective second nozzle situated aft of the respective first nozzle.

4. An aerial distribution system described in claim 2 above, the second subsystem further comprising a pressure regulator valve downstream of the injection pump, including a T-screw adjuster whereby rotation of the T-screw by a user in the aircraft adjusts the pressure of the second substance in the second subsystem.

5. An aerial distribution system described in claim 2 above, the first flow control valve means comprising a first computer governed flow control valve, the first governance means comprising a first computer with software and programming to govern the first flow control valve.

6. An aerial distribution system described in claim 2 above, the first lateral distribution means comprising an automatic gate control means for controlling the distribution of the first substance, wherein the first substance is granular.

7. An aerial distribution system described in claim 2 above whereupon, positioning the lever to concurrently activate the spray valve and the second pump means, commences both the distribution of the first substance at a constant rate and the independent distribution of the second substance at a constant rate.

8. An aerial distribution system described in claim 2 above whereupon, positioning the lever to concurrently activate the spray valve and the second pump means concurrently commences the distribution of the second substance at a constant rate and distribution timing and the independent distribution of the first substance at whatever rate(s) and timing(s) are authorized by the first governance means.

9. An aerial distribution system described in claim 2 above:
(a) the second fluid communication means further comprising a second flow control valve means to control the flow of the second substance to the second lateral distribution means; and
(b) the second subsystem further comprising a second governance means governing the rate and timing of distribution of the second substance from the second nozzles, said second governance means including computer hardware having software programming and functional connection to the second flow control valve means and including stored data concerning the target area, for recognition by the software programming to enable outputting of second electronic stimuli to control the passage of the second substance through the second flow control valve means and thereby govern the rate and timing of distribution of the second substance from the second nozzles.

10. An aerial distribution system described in claim 9 above, the second flow control valve means comprising a second computer governed flow control valve, and the second governance means comprising a second with software and programming to govern the second flow control valve.

11. An aerial distribution system described in claim 9 above, the second flow control valve means comprising a second computer governed flow control valve, and the second governance means comprising a second output from the first computer.

12. An aerial distribution system described in claim 9 above whereupon, positioning the lever to concurrently activate the spray valve and the second pump means concurrently commences both the distribution of the second substance at whatever rate(s) and timing(s) are directed by the second governance means and the independent distribution of the first substance at whatever rate(s) and timing(s) are directed by the first governance means.

13. A system improvement aboard an aircraft for controlled aerial distribution of a first substance and a second substance into any spraystream of the first substance, onto a target area of substratum or portions thereof, the aircraft including a first subsystem comprising a first tank holding the first substance awaiting distribution, a hollow boom defining a first substance distribution chamber extending laterally from the aircraft fuselage and including a plurality of first nozzles arrayed periodically thereupon and allowing distribution of the first substance in a spraystream into the air outside the boom, and first fluid communication means between the first tank and the boom comprising a first pump means downstream of the first tank, a pipeline with a lever-activated spray valve upstream of the first pump means, a first computer governed flow control valve downstream of the first pump means, and a downstream flowline to the boom from the first flow control valve to a first divider separating the flow of the first substance into a port side boom flow and a starboard side boom flow, the first subsystem further comprising a first computer having software programming and functional connection to the first flow control valve and including stored data concerning the target area, for recognition by the software programming to enable outputting of first electronic stimuli to control the passage of the first substance through the first flow control valve and thereby govern the rate and timing of distribution of the first substance from the first nozzles, the system improvement comprising:

a second subsystem comprising a second tank holding the second substance awaiting distribution, a plurality of second nozzles and second fluid communication means between the second tank and the second nozzles comprising:
(1) an intake conduit extending from the second tank to an injection pump,
(2) a second duct extending from the injection pump to a metered pressure regulator valve having a T-screw adjuster,
(3) a pressure hose extending from the pressure regulator valve to a second divider separating the flow of the second substance into a plurality of tubes extending laterally beneath the boom and supplying a port side boom outerflow and a starboard side boom outerflow, each of said tubes defining a chamberlet terminating in a respective second nozzle aft of a respective first nozzle and guiding the distribution of the second substance into any spraystream of the first substance released from the respective first nozzle;
whereas lever activation of the spray valve upon the aircraft's approach of a target area concurrently activates the injection pump.

14. An aerial distribution system described in claim 13 above whereupon, positioning the lever to concurrently activate the spray valve and the second pump means commences both the distribution of the first substance at a constant rate and the independent distribution of the second substance at a constant rate.

15. An aerial distribution system described in claim 13 above whereupon, positioning the lever to concurrently activate the spray valve and the second pump means concurrently commences the distribution of the second substance at a constant rate and distribution timing and the independent distribution of the first substance at whatever rate(s) and timing(s) are authorized by the first computer.

16. A system described in, claim 13 above:
(a) the second fluid communication means further comprising a second computer governed flow control valve to control the flow of the second substance to the tubes;
(b) the second subsystem further comprising a second computer governing the rate and timing of distribution of the second substance from the second nozzles, the second computer having software programming and functional connection to the second flow control valve and including stored data concerning the target area, for recognition by the software programming to enable outputting of second electronic stimuli to control the passage of the second substance through the second flow control valve and thereby govern the rate and timing of distribution of the second substance from the second nozzles.

17. A system described in claim 16 above whereupon, positioning the lever to concurrently activate the spray valve and injection pump commences both the distribution of the first substance at whatever rate(s) and timing(s) are directed by the first computer and the independent distribution of the second substance at whatever rate(s) and timing(s) are directed by the second Del computer.

18. An aerial distribution system described in claim 13 above, the first subsystem further comprising an automatic gate control means for controlling the flow of the first substance, wherein the first substance is granular.

19. A method of using a system described in claim 1 above, comprising the steps of
(a) installing and priming the first subsystem and the second subsystem on an aircraft having the first substance and the second substance;
(b) upon the aircraft's approach of a target area, positioning the lever to concurrently commence activate both the spray valve and the second pump means; and
(c) upon leaving the target area, repositioning the lever to concurrently deactivate both the spray valve and the second pump means.

* * * * *